United States Patent
Panandiker et al.

(10) Patent No.: US 6,228,828 B1
(45) Date of Patent: *May 8, 2001

(54) LAUNDRY DETERGENT COMPOSITIONS WITH ANIONICALLY MODIFIED, CYCLIC AMINE BASED POLYMERS

(75) Inventors: Rajan Keshav Panandiker, West Chester; Sherri Lynn Randall, Hamilton; Eugene Paul Gosselink, Cincinnati, all of OH (US); William Conrad Wertz, West Harrison, IN (US); Soren Hildebrandt, Speyer (DE); Elisabeth Kappes; Dieter Boeckh, both of Limburgerhof (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/508,608

(22) PCT Filed: Sep. 15, 1998

(86) PCT No.: PCT/US98/19141

§ 371 Date: Mar. 14, 2000

§ 102(e) Date: Mar. 14, 2000

(87) PCT Pub. No.: WO99/14299

PCT Pub. Date: Mar. 25, 1999

Related U.S. Application Data

(60) Provisional application No. 60/058,931, filed on Sep. 15, 1997.

(51) Int. Cl.$^7$ ................ C11D 1/83; C11D 1/94; C11D 3/26; C11D 3/30

(52) U.S. Cl. ............ 510/332; 510/327; 510/340; 510/350; 510/351; 510/352; 510/356; 510/360; 510/400; 510/500; 510/501; 544/242; 544/402; 548/335.5; 548/300.1

(58) Field of Search .................... 510/327, 328, 510/340, 350, 351, 352, 356, 360, 400, 500, 501, 332; 544/29, 402; 548/335.5, 300.1

(56) References Cited

U.S. PATENT DOCUMENTS

| 3,917,817 | 11/1975 | Vanderberghe | 424/70 |
| 4,013,787 | 3/1977 | Varlerberghe | 424/70 |

FOREIGN PATENT DOCUMENTS

| 196 43 281 A1 | 4/1998 | (DE) | C11D/3/42 |
| 0 209 787 | 1/1997 | (EP) | D06P/5/08 |

*Primary Examiner*—Gregory Delcotto
(74) *Attorney, Agent, or Firm*—Marianne Dressman; Kim William Zerby; Steven W. Miller

(57) ABSTRACT

Detergent compositions and fabric conditioning compositions which utilize certain anionically modified, oxidized cyclic amine based polymers, oligomers or copolymer materials. These anionically modified, cyclic amine based polymers, oilgomers or copolymers materials can impart fabric appearance and integrity benefits to fabrics and textiles laundered in washing solutions which contain such materials.

9 Claims, No Drawings

LAUNDRY DETERGENT COMPOSITIONS WITH ANIONICALLY MODIFIED, CYCLIC AMINE BASED POLYMERS

This application claims the benefit of U.S. Provisional Application No. 60/058,931, filed Sep. 15, 1997.

TECHNICAL FIELD

The present invention relates to compositions, in either liquid or granular form, for use in laundry applications, wherein the compositions comprise certain anionically modified, cyclic amine based polymer, oligomer or copolymer materials which impart appearance and integrity benefits to fabrics and textiles laundered in washing solutions formed from such compositions.

BACKGROUND OF THE INVENTION

It is, of course, well known that alternating cycles of using and laundering fabrics and textiles, such as articles of worn clothing and apparel, will inevitably adversely affect the appearance and integrity of the fabric and textile items so used and laundered. Fabrics and textiles simply wear out over time and with use. Laundering of fabrics and textiles is necessary to remove soils and stains which accumulate therein and thereon during ordinary use. However, the laundering operation itself, over many cycles, can accentuate and contribute to the deterioration of the integrity and the appearance of such fabrics and textiles.

Deterioration of fabric integrity and appearance can manifest itself in several ways. Short fibers are dislodged from woven and knit fabric/textile structures by the mechanical action of laundering. These dislodged fibers may form lint, fuzz or "pills" which are visible on the surface of fabrics and diminish the appearance of newness of the fabric. Further, repeated laundering of fabrics and textiles, especially with bleach-containing laundry products, can remove dye from fabrics and textiles and impart a faded, worn out appearance as a result of diminished color intensity, and in many cases, as a result of changes in hues or shades of color.

Given the foregoing, there is clearly an ongoing need to identify materials which could be added to laundry detergent products that would associate themselves with the fibers of the fabrics and textiles laundered using such detergent products and thereby reduce or minimize the tendency of the laundered fabric/textiles to deteriorate in appearance. Any such detergent product additive material should, of course, be able to benefit fabric appearance and integrity without unduly interfering with the ability of the laundry detergent to perform its fabric cleaning function. The present invention is directed to the use of anionically modified, cyclic amine based polymer, oligomer or copolymer materials in laundry applications which perform in this desired manner.

SUMMARY OF THE INVENTION

Anionically modified, Cyclic amine based polymer, oligomer or copolymer materials which are suitable for use in laundry operations and provide the desired fabric appearance and integrity benefits can be characterized by the following general formula:

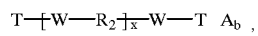

wherein;

each T is independently selected from the group consisting of H, $C_1$–$C_{12}$ alkyl, substituted alkyl, $C_7$–$C_{12}$ alkylaryl,

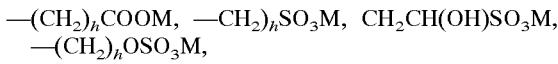

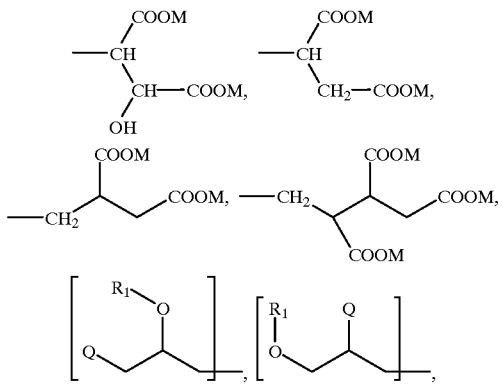

wherein W comprises at least one cyclic constituent selected from the group consisting of:

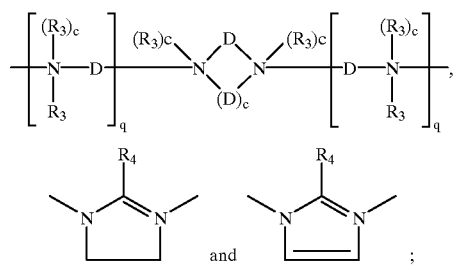

in addition to the at least one cyclic constituent, W may also comprise an aliphatic or substituted aliphatic moiety of the general structure;

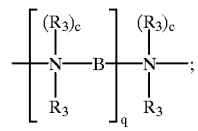

each B is independently $C_1$–$C_{12}$ alkylene, $C_1$–$C_{12}$ substituted alkylene, $C_3$–$C_{12}$ alkenylene, $C_8$–$C_{12}$ dialkylarylene, $C_8$–$C_{12}$ dialkylarylenediyl, and —$(R_5O)_n$ $R_5$—;

each D is independently $C_2$–$C_6$ alkylene;

each Q is independently selected from the group consisting of hydroxy, $C_1$–$C_{18}$ alkoxy, $C_2$–$C_{18}$ hydroxyalkoxy, amino, $C_1$–$C_{18}$ alkylamino, dialkylamino, trialkylamino groups, heterocyclic monoamino groups and diamino groups;

each $R_1$ is independently selected from the group consisting of H, $C_1$–$C_8$ alkyl and $C_1$–$C_8$ hydroxyalkyl;

each $R_2$ is independently selected from the group consisting of $C_1$–$C_{12}$ alkylene, $C_1$–$C_{12}$ alkenylene, —$CH_2$—$CH$($OR_1$)—$CH_2$, $C_8$–$C_{12}$ alkarylene, $C_4$–$C_{12}$ dihydroxyalkylene, poly($C_2$–$C_4$ alkyleneoxy)alkylene, $H_2CH(OH)CH_2OR_2OCH_2CH(OH)CH_2$—, and $C_3$–$C_{12}$ hydrocarbyl moieties;

provided that when $R_2$ is a $C_3$–$C_{12}$ hydrocarbyl moiety the hydrocarbyl moiety can comprise from about 2 to about 4 branching moieties of the general structure:

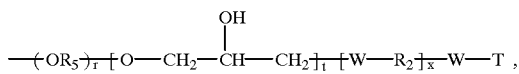

each $R_3$ is independently selected from the group consisting of H, $R_2$, $C_1$–$C_{20}$ hydroxyalkyl, $C_1$–$C_{20}$ alkyl, substituted alkyl, $C_6$–$C_{11}$ aryl, substituted aryl, $C_7$–$C_{11}$ alkylaryl, $C_1$–$C_{20}$ aminoalkyl,
—$(CH_2)_h COOM$, —$(CH_2)_n SO_3M$, $CH_2CH(OH)SO_3M$, —$(CH_2)_h OSO_3M$,

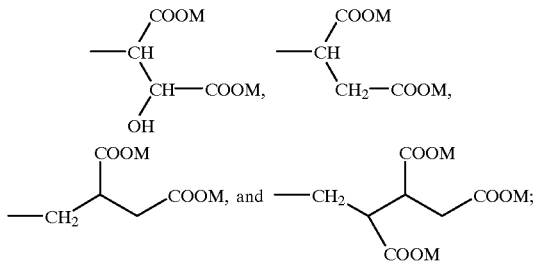

each $R_4$ is independently selected from the group consisting of H, $C_1$–$C_{22}$ alkyl, $C_1$–$C_{22}$ hydroxyalkyl, aryl and $C_7$–$C_{22}$ alkylaryl;
each $R_5$ is independently selected from the group consisting of $C_2$–$C_8$ alkylene, $C_2$–$C_8$ alkyl substituted alkylene; and
A is a compatible monovalent or di or polyvalent anion;
M is a compatible cation;
b=number necessary to balance the charge;
each x is independently from 3 to about 1000;
each c is independently 0 or 1;
each h is independently from about 1 to about 8;
each q is independently from 0 to about 6;
each n is independently from 1 to about 20;
each r is independently from 0 to about 20;
each t is independently from 0 to 1; and
wherein:
at least about 1.0%, preferably at least abut 5.0%, and more preferably at least about 10%, and most preferably at least about 20% of the total number of T and $R_3$ groups are anionic moieties selected from the group consisting of —$(CH_2)_h COOM$, —$(CH_2)_n SO_3M$, $CH_2CH(OH)SO_3M$, —$(CH_2)_h OSO_3M$,

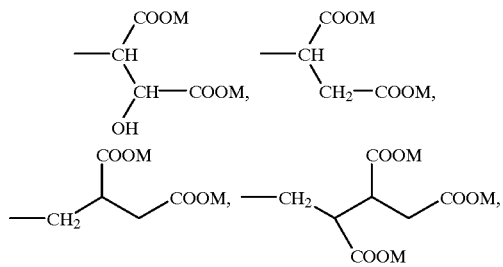

and mixtures thereof

The anionically modified, cyclic amine based polymer, oligomer or copolymer materials defined above can be used as a washing solution additive in either granular or liquid form. Alternatively, they can be admixed to granular detergents, dissolved in liquid detergent compositions or added to a fabric softening composition. The forgoing description of uses for the anionically modified, cyclic amine based fabric treatment materials defined herein are intended to be exemplary and other uses will be apparent to those skilled in the art and are intended to be within the scope of the present invention.

The laundry detergent compositions herein comprise from about 1% to 80% by weight of a detersive surfactant, from about 0.1% to 80% by weight of an organic or inorganic detergency builder and from about 0.01% to 5% by weight of the anionically modified, cyclic amine based fabric treatment materials of the present invention. The detersive surfactant and detergency builder materials can be any of those useful in conventional laundry detergent products.

Aqueous solutions of the anionically modified, cyclic amine based polymer, oligomer or copolymer materials of the subject invention comprise from about 0.01% to 80% by weight of the cyclic amine based fabric treatment materials dissolved in water and other ingredients such as stabilizers and pH adjusters.

In its method aspect, the present invention relates to the laundering or treating of fabrics and textiles in aqueous washing or treating solutions formed from effective amounts of the detergent compositions described herein, or formed from the individual components of such compositions. Laundering of fabrics and textiles in such washing solutions, followed by rinsing and drying, imparts fabric appearance benefits to the fabric and textile articles so treated. Such benefits can include improved overall appearance, pill/fuzz reduction, antifading, improved abrasion resistance, and/or enhanced softness.

DETAILED DESCRIPTION OF THE INVENTION

As noted, when fabric or textiles are laundered in wash solutions which comprise the anionically modified, cyclic amine based polymer, oligomer or copolymer materials of the present invention fabric appearance and integrity are enhanced. The anionically modified, cyclic amine based polymer, oligomer or copolymer materials of the present invention are sometimes referred to herein as "cyclic amine based fabric treatment materials" or "cyclic amine based polymer, oligomer or copolymer materials". The cyclic amine based fabric treatment materials can be added to wash solutions by incorporating them into a detergent composition, a fabric softener or by adding them separately to the washing solution. The cyclic amine based fabric treatment materials are described herein primarily as liquid or granular detergent additives but the present invention is not meant to be so limited. The cyclic amine based fabric treatment materials, detergent composition components, optional ingredients for such compositions and methods of using such compositions, are described in detail below. All percentages are by weight unless other specified.

A) Cyclic amine Based Polymer, Oligomer or Copolymer Materials

The essential component of the compositions of the present invention comprises one or more cyclic amine based polymer, oligomer or copolymer. Such materials have been found to impart a number of appearance benefits to fabrics and textiles laundered in aqueous washing solutions formed from detergent compositions which contain such cyclic amine based fabric treatment materials. Such fabric appearance benefits can include, for example, improved overall appearance of the laundered fabrics, reduction of the formation of pills and fuzz, protection against color fading, improved abrasion resistance, etc. The cyclic amine based fabric treatment materials used in the compositions and methods herein can provide such fabric appearance benefits with acceptably little or no loss in cleaning performance provided by the laundry detergent compositions into which such materials are incorporated.

The cyclic amine based polymer, oligomer or copolymer component of the compositions herein may comprise combinations of these cyclic amine based materials. For example, a mixture of piperadine and epihalohydrin condensates can be combined with a mixture of morpholine and epihalohydrin condensates to achieve the desired fabric treatment results. Moreover, the molecular weight of cyclic amine based fabric treatment materials can vary within the mixture as is illustrated in the Examples below.

These cyclic amine based polymers can be linear or branched. One specific type of branching can be intorduced using a polyfunctional crosslinking agent. An example of such such polymer is exemplified below.

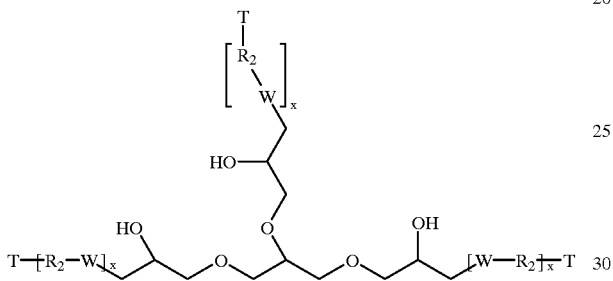

As will be apparent to those skilled in the art, an oligomer is a molecule consisting of only a few monomer units while polymers comprise considerably more monomer units. For the present invention, oligomers are defined as molecules having an average molecular weight below about 1,000 and polymers are molecules having an average molecular weight of greater than about 1,000. Copolymers are polymers or oligomers wherein two or more dissimilar monomers have been simultaneously or sequentially polymerized. Copolymers of the present invention can include, for example, polymers or oligomers polymerized from a mixture of a primary cyclic amine based monomer, e.g., piperadine, and a secondary cyclic amine monomer, e.g., morpholine.

The cyclic amine based fabric treatment component of the detergent compositions herein will generally comprise from about 0.01% to about 5% by the weight of the detergent composition. More preferably, such cyclic amine based fabric treatment materials will comprise from about 0.1% to about 4% by weight of the detergent compositions, most preferably from about 0.75% to about 3%. However, as discussed above, when used as a washing solution additive, i.e. when the cyclic amine based fabric treatment component is not incorporated into a detergent composition, the concentration of the cyclic amine based component can comprise from about 0.1% to about 80% by weight of the additive material.

Cyclic amine based polymer, oligomer or copolymer materials which are suitable for use in laundry operations and provide the desired fabric appearance and integrity benefits can be characterized by the general formula given in the Summary of the Invention. Preferred compounds that fall within this general structure include compounds:

wherein each $R_1$ is H; and
at least one W is selected from the group consisting of:

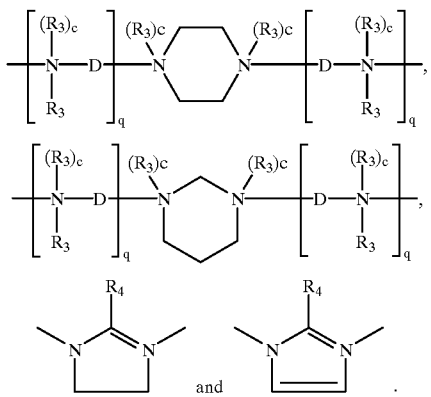

Even more preferred compounds for the fabric appearance and integrity benefits are those:
wherein each $R_1$ is H; and
at least one W is selected from the group consisting of:

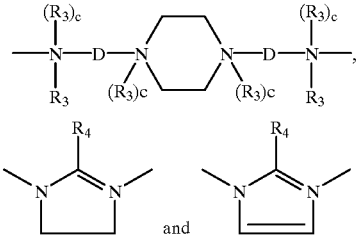

And most preferred compounds for the fabric appearance and integrity benefits are those:
wherein each $R_1$ is H; and
at least one W is selected from the group consisting of:

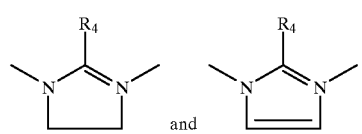

Preferred compounds to be used as the linking group $R_2$ include, but are not limited to: polyepoxides, ethylenecarbonate, propylenecarbonate, urea, α, β-unsaturated carboxylic acids, esters of α, β-unsaturated carboxylic acids, amides of α, β-unsaturated carboxylic acids, anhydrides of α, β-unsaturated carboxylic acids, di- or polycarboxylic acids, esters of di- or polycarboxylic acids, amides of di- or polycarboxylic acids, anhydrides of di- or polycarboxylic acids, glycidylhalogens, chloroformic esters, chloroacetic esters, derivatives of chloroformic esters, derivatives of chloroacetic esters, epihalohydrins, glycerol dichlorohydrins, bis-(halohydrins), polyetherdihalocompounds, phosgene, polyhalogens, functionalized glycidyl ethers and mixtures thereof. Moreover, W can also comprise a reaction product formed by reacting one or more of polyetherdiamines, alkylenediamines, polyalkylenepolyamines, alcohols, alkyleneglycols and polyalkyleneglycols with α, β-unsaturated carboxylic acids, esters of α, β-unsaturated carboxylic acids, amides of α, β-unsaturated carboxylic acids and anhydrides of α, β-unsaturated carboxylic acids provided that the reaction products contain at least two double bonds, two carboxylic groups, two amide groups or two ester groups.

Additionally preferred cyclic amine based polymer, oligomer or copolymer materials for use herein include adducts of two or more compositions selected from the group consisting of piperazine, piperadine, epichlorohydrin, epichlorohydrin benzyl quat, epichlorohydrin methyl quat, morpholine and mixtures thereof.

B) Detersive Surfactant

The detergent compositions herein comprise from about 1% to 80% by weight of a detersive surfactant. Preferably such compositions comprise from about 5% to 50% by weight of surfactant. Detersive surfactants utilized can be of the anionic, nonionic, zwitterionic, ampholytic or cationic type or can comprise compatible mixtures of these types. Detergent surfactants useful herein are described in U.S. Pat. No. 3,664,961, Norris, issued May 23, 1972, U.S. Pat. No. 3,919,678, Laughlin et al., issued Dec. 30, 1975, U.S. Pat. No. 4,222,905, Cockrell, issued Sep. 16, 1980, and in U.S. Pat. No. 4,239,659, Murphy, issued Dec. 16, 1980. All of these patents are incorporated herein by reference. Of all the surfactants, anionics and nonionics are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are a) the sodium, potassium and ammonium alkyl sulfates, especially those obtained by sulfating the higher alcohols ($C_8$–$C_{18}$ carbon atoms) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11-13}$ LAS.

Preferred nonionic surfactants are those of the formula $R_1(OC_2H_4)_nOH$, wherein $R_1$ is a $C_{10}$–$C_{16}$ alkyl group or a $C_8$–$C_{12}$ alkyl phenyl group, and n is from 3 to about 80. Particularly preferred are condensation products of $C_{12}$–$C_{15}$ alcohols with from about 5 to about 20 moles of ethylene oxide per mole of alcohol, e.g., $C_{12}$–$C_{13}$ alcohol condensed with about 6.5 moles of ethylene oxide per mole of alcohol.

Additional suitable nonionic surfactants include polyhydroxy fatty acid amides of the formula:

wherein R is a $C_{9-17}$ alkyl or alkenyl, $R_1$ is a methyl group and Z is glycityl derived from a reduced sugar or alkoxylated derivative thereof. Examples are N-methyl N-1-deoxyglucityl cocoamide and N-methyl N-1-deoxyglucityl oleamide. Processes for making polyhydroxy fatty acid amides are known and can be found in Wilson, U.S. Pat. No. 2,965,576 and Schwartz, U.S. Pat. No. 2,703,798, the disclosures of which are incorporated herein by reference.

Preferred surfactants for use in the detergent compositions described herein are amine based surfactants of the general formula:

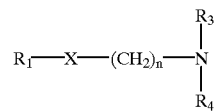

wherein $R_1$ is a $C_6$–$C_{12}$ alkyl group; n is from about 2 to about 4, X is a bridging group which is selected from NH, CONH, COO, or O or X can be absent; and $R_3$ and $R_4$ are individually selected from H, $C_1$–$C_4$ alkyl, or ($CH_2$—$CH_2$—$O(R_5)$) wherein $R_5$ is H or methyl. Especially preferred amines based surfactants include the following:

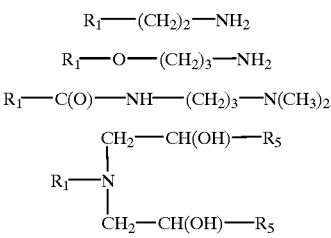

wherein $R_1$ is a $C_6$–$C_{12}$ alkyl group and $R_5$ is H or $CH_3$. Particularly preferred amines for use in the surfactants defined above include those selected from the group consisting of octyl amine, hexyl amine, decyl amine, dodecyl amine, $C_8$–$C_{12}$ bis(hydroxyethyl)amine, $C_8$–$C_{12}$ bis(hydroxyisopropyl)amine, $C_8$–$C_{12}$ amidopropyl dimethyl amine, or mixtures thereof.

In a highly preferred embodiment, the amine based surfactant is described by the formula:

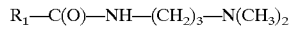

wherein $R_1$ is $C_8$–$C_{12}$ alkyl.

C) Detergent Builder

The detergent compositions herein may also comprise from about 0.1% to 80% by weight of a detergent builder. Preferably such compositions in liquid form will comprise from about 1% to 10% by weight of the builder component. Preferably such compositions in granular form will comprise from about 1% to 50% by weight of the builder component. Detergent builders are well known in the art and can comprise, for example, phosphate salts as well as various organic and inorganic nonphosphorus builders.

Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid. Other suitable polycarboxylates for use herein are the polyacetal carboxylates described in U.S. Pat. No. 4,144,226, issued Mar. 13, 1979 to Crutchfield et al., and U.S. Pat. No. 4,246,495, issued Mar. 27, 1979 to Crutchfield et al., both of which are incorporated herein by reference. Particularly preferred polycarboxylate builders are the oxydisuccinates and the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Examples of suitable nonphosphorus, inorganic builders include the silicates, aluminosilicates, borates and carbonates. Particularly preferred are sodium and potassium carbonate, bicarbonate, sesquicarbonate, tetraborate decahydrate, and silicates having a weight ratio of $SiO_2$ to alkali metal oxide of from about 0.5 to about 4.0, preferably from about 1.0 to about 2.4. Also preferred are aluminosilicates including zeolites. Such materials and their use as detergent builders are more fully discussed in Corkill et al., U.S. Pat. No. 4,605,509, the disclosure of which is incorporated herein by reference. Also discussed in U.S. Pat. No. 4,605,509 are crystalline layered silicates which are suitable for use in the detergent compositions of this invention.

D) Optional Detergent Ingredients

In addition to the surfactants, builders and cyclic amine based polymer, oligomer or copolymer materials hereinbefore described, the detergent compositions of the present invention can also include any number of additional optional ingredients. These include conventional detergent composition components such as enzymes and enzyme stabilizing agents, suds boosters or suds suppressers, anti-tarnish and anticorrosion agents, bleaching agents, soil suspending agents, soil release agents, germicides, pH adjusting agents, non-builder alkalinity sources, chelating agents, organic and inorganic fillers, solvents, hydrotropes, optical brighteners, dyes and perfumes.

pH adjusting agents may be necessary in certain applications where the pH of the wash solution is greater than about 10.0 because the fabric integrity benefits of the defined compositions begin to diminish at a higher pH. Hence, if the wash solution is greater than about 10.0 after the addition of the cyclic amine based polymer, oligomer or copolymer materials of the present invention a pH adjuster should be used to reduce the pH of the washing solution to below about 10.0, preferably to a pH of below about 9.5 and most preferably below about 7.5. Suitable pH adjusters will be known to those skilled in the art.

A preferred optional ingredients for incorporation into the detergent compositions herein comprises a bleaching agent, e.g., a peroxygen bleach. Such peroxygen bleaching agents may be organic or inorganic in nature. Inorganic peroxygen bleaching agents are frequently utilized in combination with a bleach activator.

Useful organic peroxygen bleaching agents include percarboxylic acid bleaching agents and salts thereof. Suitable examples of this class of agents include magnesium monoperoxyphthalate hexahydrate, the magnesium salt of metachloro perbenzoic acid, 4-nonylamino-4-oxoperoxybutyric acid and diperoxydodecanedioic acid. Such bleaching agents are disclosed in U.S. Pat. No. 4,483,781, Hartman, Issued Nov. 20, 1984; European Patent Application EP-A-133,354, Banks et al., Published Feb. 20, 1985; and U.S. Pat. No. 4,412,934, Chung et al., Issued Nov. 1, 1983. Highly preferred bleaching agents also include 6-nonylamino-6-oxoperoxycaproic acid (NAPAA) as described in U.S. Pat. No. 4,634,551, Issued Jan. 6, 1987 to Burns et al.

Inorganic peroxygen bleaching agents may also be used, generally in particulate form, in the detergent compositions herein. Inorganic bleaching agents are in fact preferred. Such inorganic peroxygen compounds include alkali metal perborate and percarbonate materials. For example, sodium perborate (e.g. mono- or tetra-hydrate) can be used. Suitable inorganic bleaching agents can also include sodium or potassium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commercially by DuPont) can also be used. Frequently inorganic peroxygen bleaches will be coated with silicate, borate, sulfate or water-soluble surfactants. For example, coated percarbonate particles are available from various commercial sources such as FMC, Solvay Interox, Tokai Denka and Degussa.

Inorganic peroxygen bleaching agents, e.g., the perborates, the percarbonates, etc., are preferably combined with bleach activators, which lead to the in situ production in aqueous solution (i.e., during use of the compositions herein for fabric laundering/bleaching) of the peroxy acid corresponding to the bleach activator. Various non-limiting examples of activators are disclosed in U.S. Pat. No. 4,915,854, Issued Apr. 10, 1990 to Mao et al.; and U.S. Pat. No. 4,412,934 Issued Nov. 1, 1983 to Chung et al. The nonanoyloxybenzene sulfonate (NOBS) and tetraacetyl ethylene diamine (TAED) activators are typical and preferred. Mixtures thereof can also be used. See also the hereinbefore referenced U.S. 4,634,551 for other typical bleaches and activators useful herein.

Other useful amido-derived bleach activators are those of the formulae:

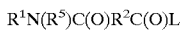

or

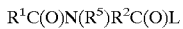

wherein $R^1$ is an alkyl group containing from about 6 to about 12 carbon atoms, $R^2$ is an alkylene containing from 1 to about 6 carbon atoms, $R^5$ is H or alkyl, aryl, or alkaryl containing from about 1 to about 10 carbon atoms, and L is any suitable leaving group. A leaving group is any group that is displaced from the bleach activator as a consequence of the nucleophilic attack on the bleach activator by the perhydrolysis anion. A preferred leaving group is phenol sulfonate.

Preferred examples of bleach activators of the above formulae include (6-octanamidocaproyl) oxybenzenesulfonate, (6-nonanamidocaproyl) oxybenzenesulfonate, (6-decanamidocaproyl)oxybenzenesulfonate and mixtures thereof as described in the hereinbefore referenced U.S. Pat. No. 4,634,551.

Another class of useful bleach activators comprises the benzoxazin-type activators disclosed by Hodge et al. in U.S. Pat. No. 4,966,723, Issued Oct. 30, 1990, incorporated herein by reference. A highly preferred activator of the benzoxazin-type is:

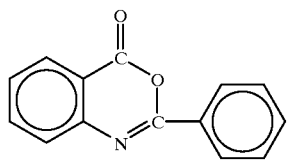

Still another class of useful bleach activators includes the acyl lactam activators, especially acyl caprolactams and acyl valerolactams of the formulae:

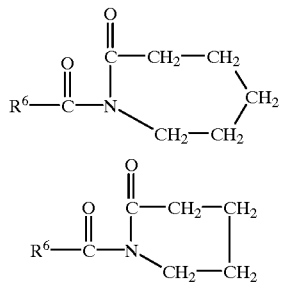

wherein $R^6$ is H or an alkyl, aryl, alkoxyaryl, or alkaryl group containing from 1 to about 12 carbon atoms. Highly preferred lactam activators include benzoyl caprolactam, octanoyl caprolactam, 3,5,5-trimethylhexanoyl caprolactam, nonanoyl caprolactam, decanoyl caprolactam, undecenoyl caprolactam, benzoyl valerolactam, octanoyl valerolactam, nonanoyl valerolactam, decanoyl valerolactam, undecenoyl valerolactam, 3,5,5-trimethylhexanoyl valerolactam and mixtures thereof. See also U.S. Pat. No. 4,545,784, Issued to Sanderson, Oct. 8, 1985, incorporated herein by reference, which discloses acyl caprolactams, including benzoyl caprolactam, adsorbed into sodium perborate.

If utilized, peroxygen bleaching agent will generally comprise from about 2% to 30% by weight of the detergent compositions herein. More preferably, peroxygen bleaching agent will comprise from about 2% to 20% by weight of the compositions. Most preferably, peroxygen bleaching agent will be present to the extent of from about 3% to 15% by weight of the compositions herein. If utilized, bleach activators can comprise from about 2% to 10% by weight of the detergent compositions herein. Frequently, activators are employed such that the molar ratio of bleaching agent to activator ranges from about 1:1 to 10:1, more preferably from about 1.5:1 to 5:1. Another highly preferred optional ingredient in the detergent compositions herein is a detersive enzyme component. Enzymes can be included in the present detergent compositions for a variety of purposes, including removal of protein-based, carbohydrate-based, or triglyceride-based stains from substrates, for the prevention of refugee dye transfer in fabric laundering, and for fabric restoration. Suitable enzymes include proteases, amylases, lipases, cellulases, peroxidases, and mixtures thereof of any suitable origin, such as vegetable, animal, bacterial, fungal and yeast origin. Preferred selections are influenced by factors such as pH-activity and/or stability, optimal thermostability, and stability to active detergents, builders and the like. In this respect bacterial or fungal enzymes are preferred, such as bacterial amylases and proteases, and fungal cellulases.

"Detersive enzyme", as used herein, means any enzyme having a cleaning, stain removing or otherwise beneficial effect in a laundry detergent composition. Preferred enzymes for laundry purposes include, but are not limited to, proteases, cellulases, lipases, amylases and peroxidases.

Enzymes are normally incorporated into detergent compositions at levels sufficient to provide a "cleaning-effective amount". The term "cleaning-effective amount" refers to any amount capable of producing a cleaning, stain removal, soil removal, whitening, deodorizing, or freshness improving effect on substrates such as fabrics. In practical terms for current commercial preparations, typical amounts are up to about 5 mg by weight, more typically 0.01 mg to 3 mg, of active enzyme per gram of the detergent composition. Stated otherwise, the compositions herein will typically comprise from 0.001% to 5%, preferably 0.01%–1% by weight of a commercial enzyme preparation. Protease enzymes are usually present in such commercial preparations at levels sufficient to provide from 0.005 to 0.1 Anson units (AU) of activity per gram of composition. Higher active levels may be desirable in highly concentrated detergent formulations.

Suitable examples of proteases are the *subtilisins* which are obtained from particular strains of *B. subtilis* and *B. licheniformis*. One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE® and SAVINASE® from Novo and MAXATASE® from International Bio-Synthetics, Inc., The Netherlands; as well as Protease A as disclosed in EP 130,756 A, Jan. 9, 1985 and Protease B as disclosed in EP 303,761 A, Apr. 28, 1987 and EP 130,756 A, Jan. 9, 1985. See also a high pH protease from Bacillus sp. NCIMB 40338 described in WO 9318140 A to Novo. Enzymatic detergents comprising protease, one or more other enzymes, and a reversible protease inhibitor are described in WO 9203529 A to Novo. Other preferred proteases include those of WO 9510591 A to Procter & Gamble. When desired, a protease having decreased adsorption and increased hydrolysis is available as described in WO 9507791 to Procter & Gamble. A recombinant trypsin-like protease for detergents suitable herein is described in WO 9425583 to Novo.

Cellulases usable herein include both bacterial and fungal types, preferably having a pH optimum between 5 and 10. U.S. Pat. No. 4,435,307, Barbesgoard et al., Mar. 6, 1984, discloses suitable fungal cellulases from *Humicola insolens* or Humicola strain DSM1800 or a cellulase 212-producing fungus belonging to the genus Aeromonas, and cellulase extracted from the hepatopancreas of a marine mollusk, Dolabella Auricula Solander. Suitable cellulases are also disclosed in GB-A-2.075.028; GB-A-2.095.275 and DE-OS-2.247.832. CAREZYME® and CELLUZYME® (Novo) are especially useful. See also WO 9117243 to Novo.

Suitable lipase enzymes for detergent usage include those produced by microorganisms of the Pseudomonas group, such as *Pseudomonas stutzeri* ATCC 19.154, as disclosed in GB 1,372,034. See also, the lipase in Japanese Patent Application 53,20487, laid open Feb. 24, 1978. This lipase is available from Amano Pharmaceutical Co. Ltd., Nagoya, Japan, under the trade name Lipase P "Amano," or "Amano-P." Other suitable commercial lipases include Amano-CES, lipases ex *Chromobacter viscosum*, e.g. *Chromobacter viscosum* var. *lipolyticum* NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli*. LIPO- LASE® enzyme derived from *Humicola lanuginosa* and commercially available from Novo, see also EP 341,947, is a preferred lipase for use herein.

The enzyme-containing compositions herein may optionally also comprise from about 0.001% to about 10%, preferably from about 0.005% to about 8%, most preferably from about 0.01% to about 6%, by weight of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, and mixtures thereof, and are designed to address different stabilization problems depending on the type and physical form of the detergent composition.

E) Detergent Composition Preparation

The detergent compositions according to the present invention can be in liquid, paste or granular form. Such compositions can be prepared by combining the essential and optional components in the requisite concentrations in any suitable order and by any conventional means.

Granular compositions, for example, are generally made by combining base granule ingredients, e.g., surfactants, builders, water, etc., as a slurry, and spray drying the resulting slurry to a low level of residual moisture (5–12%). The remaining dry ingredients, e.g., granules of the essential cyclic amine based fabric treatment materials, can be admixed in granular powder form with the spray dried granules in a rotary mixing drum. The liquid ingredients, e.g., solutions of the essential cyclic amine based fabric treatment materials, enzymes, binders and perfumes, can be sprayed onto the resulting granules to form the finished detergent composition. Granular compositions according to the present invention can also be in "compact form", i.e. they may have a relatively higher density than conventional granular detergents, i.e. from 550 to 950 g/l. In such case, the granular detergent compositions according to the present invention will contain a lower amount of "inorganic filler salt", compared to conventional granular detergents; typical filler salts are alkaline earth metal salts of sulphates and chlorides, typically sodium sulphate; "compact" detergents typically comprise not more than 10% filler salt.

Liquid detergent compositions can be prepared by admixing the essential and optional ingredients thereof in any desired order to provide compositions containing components in the requisite concentrations. Liquid compositions according to the present invention can also be in "compact form", in such case, the liquid detergent compositions according to the present invention will contain a lower amount of water, compared to conventional liquid detergents. Addition of the cyclic amine based polymer, oligomer or copolymer materials to liquid detergent or other aqueous compositions of this invention may be accomplished by simply mixing into the liquid solutions the desired cyclic amine based fabric treatment materials.

F) Fabric Laundering Method

The present invention also provides a method for laundering fabrics in a manner which imparts fabric appearance benefits provided by the cyclic amine based polymer, oligomer or copolymer materials used herein. Such a method employs contacting these fabrics with an aqueous washing solution formed from an effective amount of the detergent compositions hereinbefore described or formed from the individual components of such compositions. Contacting of fabrics with washing solution will generally occur under conditions of agitation although the compositions of the present invention may also be used to form aqueous unagitated soaking solutions for fabric cleaning and treatment. As discussed above, it is preferred that the washing solution have a pH of less than about 10.0, preferably it has a pH of about 9.5 and most preferably it has a pH of about 7.5.

Agitation is preferably provided in a washing machine for good cleaning. Washing is preferably followed by drying the wet fabric in a conventional clothes dryer. An effective amount of a high density liquid or granular detergent composition in the aqueous wash solution in the washing machine is preferably from about 500 to about 7000 ppm, more preferably from about 1000 to about 3000 ppm.

G) Fabric Conditioning and Softening

The cyclic amine based polymer, oligomer or copolymer materials hereinbefore described as components of the laundry detergent compositions herein may also be used to treat and condition fabrics and textiles in the absence of the surfactant and builder components of the detergent composition embodiments of this invention. Thus, for example, a fabric conditioning composition comprising only the cyclic amine based fabric treatment materials themselves, or comprising an aqueous solution of the cyclic amine based fabric treatment materials, may be added during the rinse cycle of a conventional home laundering operation in order to impart the desired fabric appearance and integrity benefits hereinbefore described.

The compositions of the present invention comprise at least about 1%, preferably from about 10%, more preferably from about 20% to about 80%, more preferably to about 60% by weight, of the composition of one or more fabric softener actives.

The preferred fabric softening actives according to the present invention are amines having the formula:

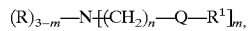

quaternary ammonium compounds having the formula:

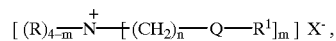

and mixtures thereof, wherein each R is independently $C_1$–$C_6$ alkyl, $C_1$–$C_6$ hydroxyalkyl, benzyl, and mixtures thereof; $R^1$ is preferably $C_{11}$–$C_{22}$ linear alkyl, $C_{11}$–$C_{22}$ branched alkyl, $C_{11}$–$C_{22}$ linear alkenyl, $C_{11}$–$C_{22}$ branched alkenyl, and mixtures thereof; Q is a carbonyl moiety independently selected from the units having the formula:

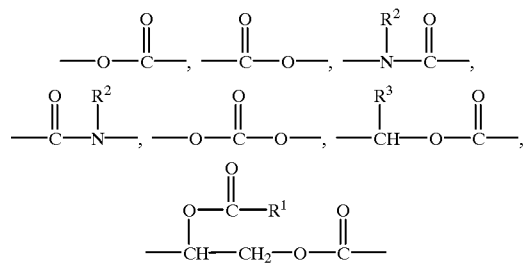

wherein $R^2$ is hydrogen, $C_1$–$C_4$ alkyl, preferably hydrogen; $R^3$ is $C_1$–$C_4$ alkyl, preferably hydrogen or methyl; preferably Q has the formula:

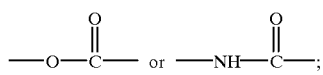

X is a softener compatible anion, preferably the anion of a strong acid, for example, chloride, bromide, methylsulfate, ethylsulfate, sulfate, nitrate and mixtures thereof, more preferably chloride and methyl sulfate. The anion can also, but less preferably, carry a double charge, in which case $X^{(-)}$ represents half a group. The index m has a value of from 1 to 3; the index n has a value of from 1 to 4, preferably 2 or 3, more preferably 2.

One embodiment of the present invention provides for amines and quaternized amines having two or more different values for the index n per molecule, for example, a softener active prepared from the starting amine methyl(3-aminopropyl)(2-hydroxyethyl)amine.

More preferred softener actives according to the present invention have the formula:

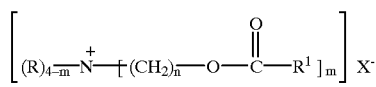

wherein the unit having the formula:

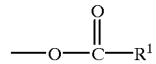

is a fatty acyl moiety. Suitable fatty acyl moieties for use in the softener actives of the present invention are derived from sources of triglycerides including tallow, vegetable oils and/or partially hydrogenated vegetable oils including inter alia canola oil, safflower oil, peanut oil, sunflower oil, corn oil, soybean oil, tall oil, rice bran oil. Yet more preferred are the Diester Quaternary Ammonium Compounds (DEQA's) wherein the index m is equal to 2. The $R^1$ units are typically mixtures of linear and branched chains of both saturated and unsaturated aliphatic fatty acids.

The formulator, depending upon the desired physical and performance properties of the final fabric softener active, can choose any of the above mentioned sources of fatty acyl moieties, or alternatively, the formulator can mix sources of triglyceride to form a "customized blend". However, those skilled in the art of fats and oils recognize that the fatty acyl composition may vary, as in the case of vegetable oil, from crop to crop, or from variety of vegetable oil source to variety of vegetable oil source. DEQA's which are prepared using fatty acids derived from natural sources are preferred.

A preferred embodiment of the present invention provides softener actives comprising $R^1$ units which have at least about 3%, preferably at least about 5%, more preferably at least about 10%, most preferably at least about 15% $C_{11}$–$C_{22}$ alkenyl, including polyalkenyl (polyunsaturated) units inter alia oleic, linoleic, linolenic.

For the purposes of the present invention the term "mixed chain fatty acyl units" is defined as "a mixture of fatty acyl units comprising alkyl and alkenyl chains having from 10 carbons to 22 carbon atoms including the carbonyl carbon atom, and in the case of alkenyl chains, from one to three double bonds, preferably all double bonds in the cis configuration". With regard to the $R^1$ units of the present invention, it is preferred that at least a substantial percentage of the fatty acyl groups are unsaturated, e.g., from about 25%, preferably from about 50% to about 70%, preferably to about 65%. The total level of fabric softening active containing polyunsaturated fatty acyl groups can be from about 3%, preferably from about 5%, more preferably from about 10% to about 30%, preferably to about 25%, more preferably to about 18%. As stated herein above cis and trans isomers can be used, preferably with a cis/trans ratio is of from 1:1, preferably at least 3:1, and more preferably from about 4:1 to about 50:1, more preferably about 20:1, however, the minimum being 1:1.

The level of unsaturation contained within the tallow, canola, or other fatty acyl unit chain can be measured by the Iodine Value (IV) of the corresponding fatty acid, which in the present case should preferably be in the range of from 5 to 100 with two categories of compounds being distinguished, having a IV below or above 25.

Indeed, for compounds having the formula:

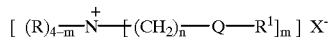

derived from tallow fatty acids, when the Iodine Value is from 5 to 25, preferably 15 to 20, it has been found that a cis/trans isomer weight ratio greater than about 30/70, preferably greater than about 50/50 and more preferably greater than about 70/30 provides optimal concentrability.

For compounds of this type made from tallow fatty acids having a Iodine Value of above 25, the ratio of cis to trans isomers has been found to be less critical unless very high concentrations are needed. A further preferred embodiment of the present invention comprises DEQA's wherein the average Iodine Value for $R^1$ is approximately 45.

The $R^1$ units suitable for use in the isotropic liquids present invention can be further characterized in that the Iodine Value (IV) of the parent fatty acid, said IV is preferably from about 10, more preferably from about 50, most preferably from about 70, to a value of about 140, preferably to about 130, more preferably to about 115. However, formulators, depending upon which embodiment of the present invention they choose to execute, may wish to add an amount of fatty acyl units which have Iodine Values outside the range listed herein above. For example, "hardened stock" (IV less than or equal to about 10) may be combined with the source of fatty acid admixture to adjust the properties of the final softener active.

A preferred source of fatty acyl units, especially fatty acyl units having branching, for example, "Guerbet branching", methyl, ethyl, etc. units substituted along the primary alkyl chain, synthetic sources of fatty acyl units are also suitable. For example, the formulator may with to add one or more fatty acyl units having a methyl branch at a "non-naturally occurring" position, for example, at the third carbon of a $C_{17}$ chain. What is meant herein by the term "non-naturally occurring" is "acyl units which are not found in significant (greater than about 0.1%) quantities is common fats and oils which serve as feedstocks for the source of triglycerides described herein." If the desired branched chain fatty acyl unit is unavailable from readily available natural feedstocks, therefore, synthetic fatty acid can be suitably admixed with other synthetic materials or with other natural triglyceride derived sources of acyl units.

Additional fabric softening agents useful herein are described in U.S. Pat. No. 5,643,865 Mermelstein et al., issued Jul. 1, 1997; U.S. Pat. No. 5,622,925 de Buzzaccarini et al., issued Apr. 22, 1997; U.S. Pat. No. 5,545,350 Baker et al., issued Aug. 13, 1996; U.S. Pat. No. 5,474,690 Wahl et al., issued Dec. 12, 1995; U.S. Pat. No. 5,417,868 Turner et al., issued Jan. 27, 1994; U.S. Pat. No. 4,661,269 Trinh et al., issued Apr. 28, 1987; U.S. Pat. No. 4,439,335 Burns, issued Mar. 27, 1984; U.S. Pat. No. 4,401,578 Verbruggen, issued Aug. 30, 1983; U.S. Pat. No. 4,308,151 Cambre, issued Dec. 29, 1981; U.S. Pat. No. 4,237,016 Rudkin et al., issued Oct. 27, 1978; U.S. Pat. No. 4,233,164 Davis, issued Nov. 11, 1980; U.S. Pat. No. 4,045,361 Watt et al., issued Aug. 30, 1977; U.S. Pat. No. 3,974,076 Wiersema et al., issued Aug. 10, 1976; U.S. Pat. No. 3,886,075 Bernadino, issued May 6, 1975; U.S. 3,861,870 Edwards et al., issued Jan. 21, 1975; and European Patent Application publication No. 472,178, by Yamamura et al., all of said documents being incorporated herein by reference.

EXAMPLES

The following Examples are meant to illustrate the compositions of the present invention and method of making them. Thes following examples are not meant to limit the scopr of this invention in any way.

Example 1

A solution of 92.6 g (1.36 moles) of imidazole in 140.5 g of water was heated to 50° C. and combined in the course of 10 minutes with an aqueous solution of 8.2 g (0.07 moles) of the sodium salt of 2-chloroacetic acid in 50 g of water. The solution is then heated at 65° C. until all of the sodium salt of 2-chloroacetic acid has reacted as can be analytically determined by the chloride ion content of the solution. 5.6 g (0.07 moles) of a 50% strength by weight aqueous solution of sodium hydroxide were added and 89.7 g (0.97 moles) of epichlorohydrin were added while stirring within 30 minutes so that the temperature of the reaction mixture could be kept in the range of from 55 to 65° C. After the addition of epichlorohydrin the reaction mixture was heated to 80° C. and stirred for 4 hours at this temperature. After this period no more alkylating agent could be detected. 377.7 g of a yellowish aqueous solution of an amphoteric amine based polymer having a net cationic charge of 4.2 mequiv/g polymer were obtained. The solution had a pH of 6.97 and contained 50.3% of water, 0.06% of glycolic acid and less than 0.05% of 2-chloroacetic acid. The molecular weight of the polymer was Mn=700, Mw=1,460 and Mw/Mn=2.1.

Example 2

According to the procedure given in Example 1, 92.6 g (1.36 moles) of imidazole, 16.3 g (0.14 moles) of the sodium salt of 2-chloroacetic acid, 11.2 g (0.14 moles) of a 50% strength by weight aqueous solution of sodium hydroxide and 86.1 g (0.93 moles) of epichlorohydrin were reacted. 386.3 g of a yellowish aqueous solution of an amphoteric amine based polymer having a net cationic charge of 3.4 mequiv/g polymer were obtained. The solution had a pH of 7.10 and contained 49.6% of water, 0.1% glycolic acid and less than 0.05% of 2-chloroacetic acid. The molecular weight of the polymer was Mn=650, Mw=1,320 and Mw/Mn=2.0.

Example 3

According to the procedure given in Example 1, 92.6 g (1.36 moles) of imidazole dissolved in 122.6 g of water, 39.6 g (0.34 moles) of the sodium salt of 2-chloroacetic acid dissolved in 100 g of water, 27.2 g (0.34 moles) of a 50% strength by weight aqueous solution of sodium hydroxide and 76.8 g (0.83 moles) of epichlorohydrin were reacted. 386.3 g of a yellowish aqueous solution of an amphoteric amine based polymer having a net cationic charge of 2.8 mequiv/g were obtained. The solution had a pH of 7.82 and contained 53.4% of water, 0.2% of glycolic acid and less than 0.05% of 2-chloroacetic acid. The molecular weight of the polymer was Mn=540, Mw=1,060 and Mw/Mn=2.0.

Example 4

Example 1 was repeated with the exceptions that 68.1 g (1.0 mole) of imidazole dissolved in 54.9 g of water, 72.0 g (0.6 moles) of the sodium salt of 2- chloroacetic acid dissolved in 150 g of water, 48.0 g (0.6 moles) of a 50% strength by weight solution of sodium hydroxide and 64.8 g (0./ moles) of epichlorohydrin were reacted. 446.4 g of a dark yellow aqueous solution of an amphoteric amine based polymer having a net cationic charge of 3.2 mequiv/g were obtained. The solution had a pH of 12.29 and contained 48.2% of water, 0.5% of glycolic acid and less than 0.05% of 2-chloroacetic acid. The molecular weight of the polymer was Mn=740, Mw=1,690 and Mw/Mn=2.3.

Example 5

Example 1 was repeated with the exceptions that 71.5 g (1.05 moles) of imidazole dissolved in 116.3 g of water, 40.8 g (0.34 moles) of the sodium salt of 2-chloroacetic acid dissolved in 100 g of water, 27.2 g (0.24 moles) of a 50% strength by weight solution of sodium hydroxide and 76.8 g (0.83 moles) of epichlorohydrin were reacted. 427.6 g of a yellow aqueous solution of an amphoteric amine based polymer having a net cationic charge of 3.7 mequiv/g and a K value of 9.5 were obtained. The solution had a pH of 11.62 and contained 54.2% of water, 0.3% of glycolic acid and less than 0.05% of 2-chloroacetic acid. The molecular weight of the polymer was Mn=1,050, Mw 32 2,380 and Mw/Mn=2.3.

Example 6

68.1 g (1 mole) of imidazole were dissolved in 73.6 g of water and heated to a temperature of 50° C. As soon as this temperature had been reached, a solution of 73.5 g (0.34 moles) of the sodium salt of 3-chloro-2-hydroxypropanesulfonic acid in 150 g of water and 27.2 g (0.34 moles) of a 50% strength by weight aqueous solution of sodium hydroxide were simultaneously added with stirring over a period of 25 minutes. The reaction mixture was then stirred at a temperature of from 65 to 90° C. until all of the sodium salt of 3-chloro-2-hydroxypropanesulfonic acid had reacted as determined analytically by measuring the concentration of chloride ions in the solution. The solution was cooled to 55° C. and 76.8 g (0.83 moles) of epichlorohydrin were introduced within 30 minutes at such a rate that the temperature of the reaction mixture could be kept at 55° C. After completion of the epichlorohydrin addition the reaction mixture was heated to 80° C. and stirred for 4 hours at this temperature. After this period no more alkylating agent could be detected in the reaction mixture. 461.3 g of a clear yellow aqueous solution of an amphoteric amine based polymer having a net cationic charge of 2.9 mequiv/g polymer and a K value of 10.0 were obtained. The solution had a pH of 11.55 and contained 52.4% of water. The molecular weight of the polymer was Mn=1,800, Mw=3,490 and Mw/Mn=1.95.

Example 7

Example 6 was repeated with the exception that 34.1 g (0.5 moles) of imidazole dissolved in 31.3 g of water, 64.8 g (0.35 moles) of the sodium salt of 3chloro-2-hydroxypropanesulfonic acid dissolved in 100 g of water, 24.0 g (0.3 moles) of a 50% strength by weight aqueous solution of sodium hydroxide and 32.4 g (0.35 moles) of epichlorohydrin were reacted. 284.1 g of a clear yellow aqueous solution of an amphoteric amine based polymer having a net cationic charge of 3.3 mequiv/g polymer and a K value of 7.6 were obtained. The solution had a pH of 11.92 and contained 51.7% of water. The molecular weight of the polymer was Mn=1,100, Mw=1,990 and Mw/Mn=1.80.

Example 8

137.6 g (2.0 moles) of imidazole and 173.6 g (2.0 moles) of piperazine were dissolved in 681.2 g of water. The aqueous solution was then heated to 50° C. At this temperature 370 g (4.0 mole) of epichlorohydrin were added while stirring within 1 hour at a temperature of from 50–60° C. After the epichlorohydrin addition the reaction mixture was heated to 80° C. and stirred at this temperature for 5 hours. A sample of the reaction mixture was then tested for alkylating substances (epichlorohydrin). No more epichlorohydrin could be detected. The reaction mixture was cooled to room temperature.

250 g of the reaction mixture described above were placed in a flask fitted with a stirrer and a reflux condenser. The pH of the reaction mixture was adjusted to 8.1 by the addition of a 25% strength by weight aqueous solution of sodium hydroxide. The contents of the flask were heated to 50° C. At this temperature 53.5 g (0.223 moles) of a 50% aqueous solution of the sodium salt of 2-chloroacetic acid were added within 70 minutes with stirring. The reaction mixture was then stirred for 2 hours at 50° C., then heated to 70° C. and stirred for 3 hours at this temperature and thereafter kept for 2 hours at 90–100° C. while keeping its pH at 8 by the addition of a 25% strength by weight aqueous solution of sodium hydroxide. After cooling to room temperature a yellowish aqueous solution of an amphoteric polymer having a net cationic charge of 3.4 mequiv/g polymer and a K value of 22.0 was obtained. The solution had a pH of 9.9 and contained 61.8% of water. The molecular weight of the polymer was Mn=2,500, Mw=27,500 and Mw/Mn=10.8.

Example 9

Example 8 was repeated with the exceptions that 137.6 g (2.0 moles) of imidazole, 173.6 g (2.0 moles) of piperazine dissolved in 681.2 g of water were reacted with 370 g (4.0 moles) of epichlorohydrin. 250 g of the reaction mixture so obtained were then quaternized with 110.4 g (0.446 moles) of a 50% strength by weight aqueous solution of the sodium salt of 2-chloroacetic acid by first stirring the reaction mixture for 14 hours at 50–60° C. and thereafter for 2 hours at 90–100° C. After cooling to room temperature a yellow aqueous solution of an amphoteric polymer having a net cationic charge of 2.6 mequiv/g polymer and a K value of 15.7 was obtained. The solution had a pH of 9.8 and contained 56.9% of water. The molecular weight of the amphoteric polymer was Mn=1,550, Mw=13,000 and Mw/Mn=8.4.

Example 10

Example 8 was repeated with the exceptions that 68.8 g (1.0 mole) of imidazole, 260.6 g (3.0 mole) piperazine dissolved in 700.2 g of water were reacted with 370 g (4.0 moles) of epichlorohydrin. 250 g of the reaction mixture so obtained were then quaternized with 77.0 g (0.321 moles) of a 50% strength by weight aqueous solution of the sodium salt of 2-chloroacetic acid by stirring the reaction mixture for 4 hours at 70° C. An aqueous solution of an amphoteric polymer having a net cationic charge of 1.5 mequiv/g polymer and a K value of 16.5 was obtained. The solution had a pH of 8.59 and contained 54.7% of water.

Example 11

137.6 g (2.0 moles) of imidazole, 173.6 g (2.0 moles) of piperazine dissolved in 681.2 g of water were reacted with 370 g (4.0 moles) of epichlorohydrin as specified in Example 8. 52.8 g (0.733 moles) of a 47.2% strength by weight aqueous solution of hydrogen peroxide were added at a temperature of 40° C. within 3 hours to a sample of 224 g of the said reaction product which contained 0.666 moles of tertiary nitrogen atoms from the piperazine (these nitrogen atoms can be oxidized). After standing overnight the reaction mixture was stirred at 40–60° C. until the theoretical amount of hydrogen peroxide had been consumed. The excess of hydrogen peroxide was destroyed by the addition of Pt/C. After filtration of the reaction mixture 252.4 g of an amphoteric amine based polymer having a net cationic charge of 2.7 were obtained. The aqueous solution had pH of 3.29 and contained 55.2% of water. The amphoteric polymer had a molecular weight Mn=400, Mw=1,440 and Mw/Mn=3.6.

Example 12

68.8 g (1 mole) of imidazole, 260.6 (3 moles) of piperazine dissolved in 700.2 g of water were reacted according to the procedure given in Example 8 with 370 g (4.0 moles) of epichlorohydrin. A sample of 237 g of the reaction product was obtained which contained 1.022 moles tertiary nitrogen atoms (these nitrogen atoms are from the condensed piperazine and can be oxidized) was heated to 40° C. and oxidized at this temperature by the addition of 80.7 g (1.12 moles) of a 47.2% strength by weight aqueous solution of hydrogen peroxide within 5 hours. The reaction mixture was stirred at 50–60° C. until the theoretical amount of hydrogen peroxide nesessary for the oxidation had been consumed. The excess of hydrogen peroxide was destroyed by Pt/C, the polymer solution filtered and cooled to room temperature. 296.8 g of an aqueous solution of an amphoteric amine based polymer having a net cationic charge of 0.7 were obtained. The aqueous solution had a pH of 2.86 and contained 58.6% of water. The amphoteric polymer had a molecular weight Mn=340, Mw=940 and Mw/Mn=2.8.

Example 13

68.8 g (1.0 mole) of imidazole, 260.4 g (3.0 moles) of piperazine dissolved in 699.2 g of water were reacted according to the procedure given in Example 8 with 370 g (4 moles) of epichlorohydrin with the exception that the pH of the reaction medium was kept at 7 by the addition of a 50% strength by weight aqueous solution of sodium hydroxide. A sample of 500 g of the reaction product which contained 1.98 moles of tertiary nitrogen atoms (these nitrogen atoms are from the condensed piperazine and can be oxidized) was heated to 50° C. At this temperature 71.6 g (1.08 moles) of a 49% strength by weight aqueous solution of hydrogen peroxide were added within 3.5 hours. The mixture was then stirred for 12 hours at 50° C. After this period no more hydrogen peroxide could be detected. 537.4 g of an aqueous solution of an amphoteric amine based polymer having a net cationic charge of 1.2 mequiv/g polymer were obtained. The aqueous solution had a pH of 5.86 and contained 56.5% of water. The amphoteric polymer had a K value of 23.4, a molecular weight Mn=1,340, Mw=16,300 and Mw/Mn=12.2.

Example 14

27.2 g (0.4 moles) of imidazole, 340.4 g (4.0 moles) of piperazine dissolved in 774.6 g of water were reacted according to the procedure given in Example 8 with 407 g (4.4 moles) of epichlorohydrin using 80 g (1.0 mole) of a 50% strength by weight aqueous solution of sodium hydroxide. A sample of 259.1 g of the reaction mixture which contained 1.272 moles of tertiary nitrogen atoms (these nitrogen atoms are from the condensed piperazine and can be oxidized) was heated to 60° C. At this temperature 113.6 g (1.6 moles) of a 50% strength by weight aqueous solution of hydrogen peroxide were added within 3.5 hours. The reaction mixture was then stirred for 2.5 hours at 60° C. and thereafter cooled to room temperature. A solution of an amphoteric amine based polymer having a net cationic charge of 0.3 mequiv/g and a K value was obtained. The aqueous solution had a pH of 5.49. The amphoteric polymer had a molecular weight Mn=430, Mw=1,420 and Mw/Mn= 3.3. More than 95% of the tertiary nitrogen atoms had been oxidized.

Example 15

A heavy duty powder comprised of the following ingredients is prepared:

| Component | Example Wt. % |
|---|---|
| $C_{12}$ Linear alkyl benzene sulfonate | 9.40 |
| $C_{14-15}$ alkyl sulfonate | 11.26 |
| Zeolite Builder | 27.79 |
| Sodium Carbonate | 27.31 |
| PEG 4000 | 1.60 |
| Dispersant | 2.26 |
| $C_{12-13}$ alkyl ethoxylate (E9) | 1.5 |
| Sodium Perborate | 1.03 |
| Soil Release Polymer | 0.41 |
| Enzymes | 0.46 |
| Polymer/Oligomer shown in the Table 15 | 0.8 |
| Perfume, Brightener, Suds Suppressor, Other Minors, Moisture, Sulfate | Balance |
|  | 100% |

TABLE 15

| Material | Level (wt %) |
|---|---|
| 1 Adduct of imidazole-epichlorohydrin and chloroacetic acid (Ratio- 1.36:0.97:0.07) | 0.8 |
| 2 Adduct of imidazole-epichlorohydrin and chloroacetic acid (Ratio- 1.36:0.93:0.14) | 0.8 |
| 3 Adduct of imidazole-epichlorohydrin and chloroacetic acid (Ratio- 1.36:0.83:0.34) | 0.8 |
| 4 Adduct of imidazole-epichlorohydrin and 3chlorohydroxypropyl sulfonic acid (ratio: 1.0:0.83:0.34) | 0.8 |
| 5 Adduct of imidazole-epichlorohydrin and 3 chlorohydroxypropyl sulfonic acid (ratio: 1.0:0.75:0.5) | 0.8 |

TABLE 15-continued

| Material | Level (wt %) |
|---|---|
| 6  Adduct of imidazole, piperazine and epichlorohydrin (Ratio- 1.0:1.0:2.0) quat with 0.22 moles of chloroacetate | 0.8 |

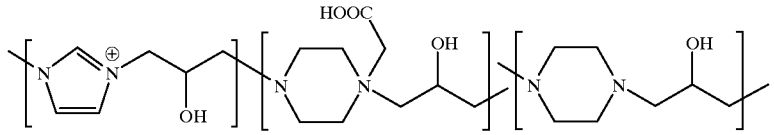

| 7  Adduct of imidazole, piperazine and epichlorohydrin (Ratio- 1.0:3.0:4.0) quat with 0.32 moles of chloroacetate | 0.8 |

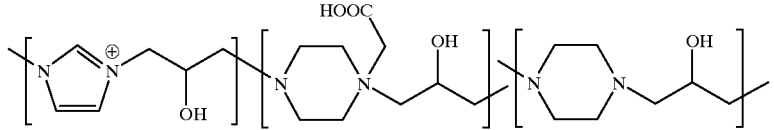

| 8  Adduct of imidazole, piperazine and epichlorohydrin (Ratio- 1.0:1.0:2.0) quat with 0.45 moles of chloroacetate | 0.8 |

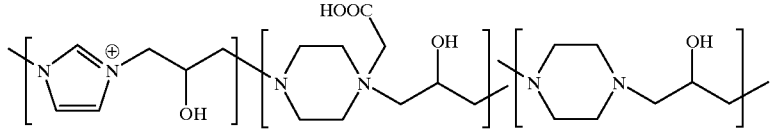

What is claimed is:

1. A detergent composition comprising:

a) from 1% to 80% by weight of surfactants selected from the group consisting of nonionic, anionic, cationic, amphoteric zwitterionic surfactants and mixtures thereof; and b) from 0.01% to 5.0% by weight of a mixture of cyclic amine based polymers, oligomers or copolymers of the general formula:

$$T-[W-R_2]_x-W-T \ A_b ,$$

wherein;

each T is independently selected from the group consisting of H, $C_1$–$C_{12}$ alkyl, substituted alkyl, $C_7$–$C_{12}$ alkylaryl, —$(CH_2)_h COOM$, —$(CH_2)_h SO_3M$, $CH_2CH(OH)SO_3M$, —$(CH_2)_h OSO_3M$,

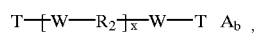
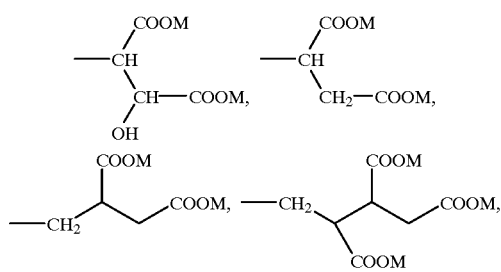

-continued

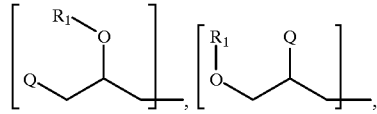

wherein W comprises at least one cyclic constituent selected group consisting of:

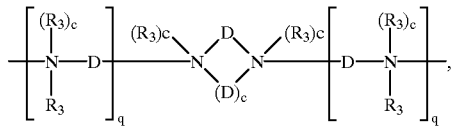

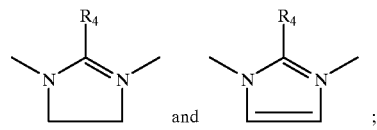

in addition to the at least one cyclic constituent, W may also comprise an aliphatic or substituted aliphatic moiety of the general structure;

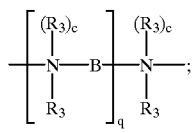

each B is independently $C_1$–$C_{12}$ alkylene, $C_1$–$C_{12}$ substituted alkylene, $C_3$–$C_{12}$ alkenylene, $C_8$–$C_{12}$ dialkylarylene, $C_8$–$C_{12}$ dialkylarylenediyl, and —$(R_5O)_n$ $R_5$—;

each D is independently $C_2$–$C_6$ alkylene;

each Q is independently selected from the group consisting of hydroxy, $C_1$–$C_{18}$ alkoxy, $C_2$–$C_{18}$ hydroxyalkoxy, amino, $C_1$–$C_{18}$ alkylamino, dialkylamino, trialkylamino groups, heterocyclic monoamino groups and diamino groups;

each $R_1$ is independently selected from the group consisting of H, $C_1$–$C_8$ alkyl and $C_1$–$C_8$ hydroxyalkyl;

each $R_2$ is independently selected from the group consisting of $C_1$–$C_{12}$ alkylene, $C_1$–$C_{12}$ alkenylene, —$CH_2$—CH $(OR_1)$—$CH_2$, $C_8$–$C_{12}$ alkarylene, $C_4$–$C_{12}$ dihydroxyalkylene, poly($C_2$–$C_4$ alkyleneoxy)alkylene, $H_2CH(OH)CH_2OR_2OCH_2CH(OH)CH_2$—, and $C_3$–$C_{12}$ hydrocarbyl moieties;

provided that when $R_2$ is a $C_3$–$C_{12}$ hydrocarbyl moiety the hydrocarbyl moiety can comprise from 2 to 4 branching moieties of the general structure:

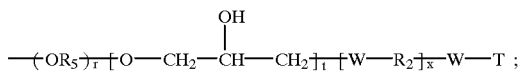

each $R_3$ is independently selected from the group consisting of H, $R_2$, $C_1$–$C_{20}$ hydroxyalkyl, $C_1$–$C_{20}$ alkyl, substituted alkyl, $C_6$–$C_{11}$ aryl, substituted aryl, $C_7$–$C_{11}$ alkylaryl, $C_1$–$C_{20}$ aminoalkyl, —$(CH_2)_hCOOM$, —$(CH_2)_hSO_3M$, $CH_2CH(OH)SO_3M$, —$(CH_2)_hOSO_3M$,

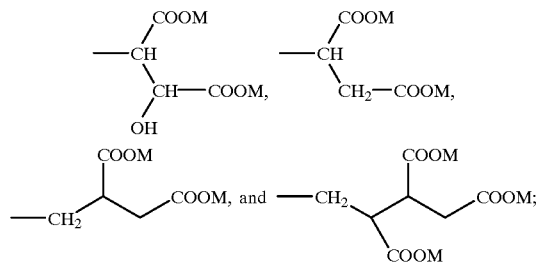

each $R_4$ is independently selected from the group consisting of H, $C_1$–$C_{22}$ alkyl, $C_1$–$C_{22}$ hydroxyalkyl, aryl and $C_7$–$C_{22}$ alkylaryl;

each $R_5$ is independently selected from the group consisting of $C_2$–$C_8$ alkylene, $C_2$–$C_8$ alkyl substituted alkylene; and A is a compatible monovalent or di or polyvalent anion;

M is a compatible cation;

b=number necessary to balance the charge;

each x is independently from 3 to 1000;

each c is independently 0 or 1;

each h is independently from 1 to 8;

each q is independently from 0 to 6;

each n is independently from 1 to 20;

each r is independently from 0 to 20;

each t is independently from 0 to 1; and wherein:

at least 1.0% of the total number of T and $R_3$ groups are anionic moieties selected from the group consisting of —$(CH_2)_hCOOM$, —$(CH_2)_hSO_3M$, $CH_2CH(OH)SO_3M$, —$(CH_2)_hOSO_3M$,

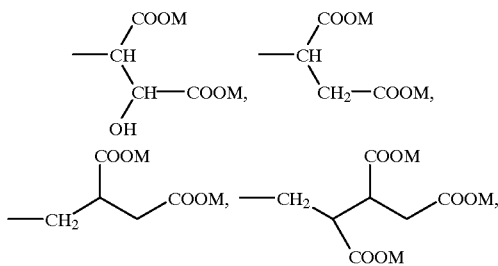

and mixtures thereof.

2. The detergent composition of claim 1, wherein the cyclic amine based polymers, oligomers or copolymers are adducts of two or more compositions selected from the group consisting of piperazine, piperadine, epichlorohydrin, epichlorohydrin benzyl quat, epichlorohydrin methyl quat, morpholine and mixtures thereof.

3. The detergent composition of claim 1, wherein each $R_1$ is H and at least one W is selected from the group consisting of:

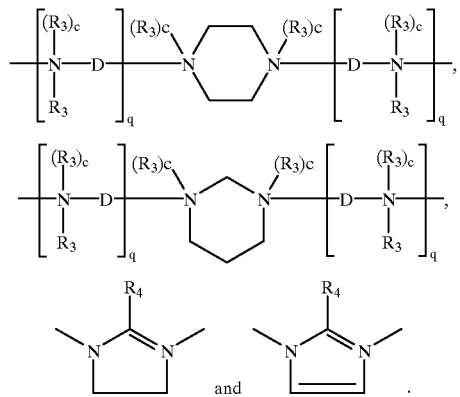

4. The detergent composition of claim 1, wherein each $R_1$ is H and at least one W is selected from the group consisting of:

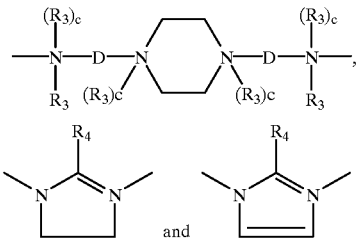

5. The detergent composition of claim 1, wherein each $R_1$ is H and at least one W is selected from the group consisting of:

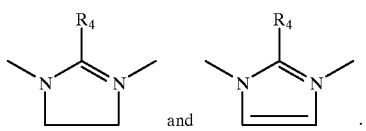

6. The laundry detergent composition of claim 1, wherein x is from 3 to 25.

7. The laundry detergent composition of claim 1, wherein x is from 4 to 20.

8. The detergent composition of claim 1, further comprising detergent additives selected from the group consisting of enzymes, enzyme stabilizing agents, suds boosters, suds suppressers, anti-tarnish agents, anticorrosion agents, bleaching agents, soil suspending agents, soil release agents, germicides, pH adjusting agents, builders, non-builder alkalinity sources, chelating agents, organic fillers, inorganic fillers, solvents, hydrotropes, optical brighteners, dyes, perfumes and mixtures thereof.

9. The detergent composition of claim 1, further comprising an inorganic peroxygen bleaching agent and a bleach activator.

* * * * *